(12) United States Patent
Arsenault et al.

(10) Patent No.: US 9,389,440 B2
(45) Date of Patent: Jul. 12, 2016

(54) REVERSIBLY RESPONSIVE LIGHT-SCATTERING PHOTONIC MATERIAL

(75) Inventors: Eric Arsenault, Calgary (CA); Andre Arsenault, Toronto (CA)

(73) Assignee: OPALUX INCORPORATED, Toronto (CA)

( * ) Notice: Subject to any disclaimer, the term of this patent is extended or adjusted under 35 U.S.C. 154(b) by 327 days.

(21) Appl. No.: 13/885,641

(22) PCT Filed: Nov. 10, 2011

(86) PCT No.: PCT/CA2011/001254
§ 371 (c)(1),
(2), (4) Date: Sep. 4, 2013

(87) PCT Pub. No.: WO2012/065244
PCT Pub. Date: May 24, 2012

(65) Prior Publication Data
US 2013/0335807 A1    Dec. 19, 2013

Related U.S. Application Data

(60) Provisional application No. 61/413,746, filed on Nov. 15, 2010.

(51) Int. Cl.
*G03F 7/00* (2006.01)
*C09B 67/00* (2006.01)
(Continued)

(52) U.S. Cl.
CPC .............. *G02F 1/0128* (2013.01); *B82Y 20/00* (2013.01); *G02F 1/0072* (2013.01); *G02F 1/0131* (2013.01); *G02F 1/19* (2013.01); *G02B 1/005* (2013.01); *G02B 1/02* (2013.01); *G02B 1/04* (2013.01); *G02B 3/0006* (2013.01); *G02B 5/0257* (2013.01); *G02B 5/206* (2013.01); *G02B 5/208* (2013.01); *G02B 5/223* (2013.01); *G02B 26/005* (2013.01); *G02B 27/42* (2013.01);
(Continued)

(58) Field of Classification Search
CPC ........ G02B 1/04; G02B 26/005; G02B 5/208; G02B 1/02; G02B 5/223; G02B 27/42; G02B 3/0006; G02B 5/0257; G02B 1/005; G02B 5/206; G02F 1/167; G02F 1/0128; G02F 1/0131; G02F 1/0018
USPC .......................... 359/290–292, 295, 298, 238; 252/501.1, 582, 583, 587, 588; 430/4, 430/271.1, 290, 291, 321
See application file for complete search history.

(56) References Cited

U.S. PATENT DOCUMENTS 3,149,967 A    9/1964 Bechtold ................ 430/300
3,306,763 A    2/1967 Hoge ..................... 427/146
(Continued)

OTHER PUBLICATIONS

Budd et al, "Polymers of intrinsic microporosity (PIMs): robust, solution-processable, organic nanoporous materials", *Chem. Commun.*, 2:230-231, 2004.
(Continued)

*Primary Examiner* — Evelyn A Lester
(74) *Attorney, Agent, or Firm* — Norton Rose Fulbright US LLP

(57) ABSTRACT

A light-scattering photonic material is disclosed having a matrix defining a plurality of disordered voids. The material may be reversibly responsive to an external stimulus, exhibiting reversible first and second optical effects. The material may be a thin film material.

33 Claims, 7 Drawing Sheets

(51) Int. Cl.
*G02B 5/02* (2006.01)
*G02B 5/26* (2006.01)
*G02B 26/00* (2006.01)
*G02F 1/01* (2006.01)
*B82Y 20/00* (2011.01)
*G02F 1/19* (2006.01)
*G02B 1/00* (2006.01)
*G02B 1/02* (2006.01)
*G02B 1/04* (2006.01)
*G02F 1/167* (2006.01)
*G02B 3/00* (2006.01)
*G02B 5/20* (2006.01)
*G02B 5/22* (2006.01)
*G02B 27/42* (2006.01)
*G02F 1/00* (2006.01)

(52) U.S. Cl.
CPC ............... *G02F1/0018* (2013.01); *G02F 1/167* (2013.01); *G02F 2202/32* (2013.01)

(56) References Cited

U.S. PATENT DOCUMENTS 6,261,469 B1  7/2001  Zakhidov et al. ............... 216/56
2003/0174994 A1  9/2003  Garito et al. .................. 385/129
2008/0224103 A1  9/2008  Arsenault et al. .......... 252/519.2
2008/0253411 A1*  10/2008  McPhail ................ B82Y 20/00
                                                                372/26
2009/0034051 A1  2/2009  Arsenault et al. ............. 359/290
2012/0305061 A1*  12/2012  O'Brien ................ C03C 17/006
                                                                136/255

OTHER PUBLICATIONS

Chin et al., *Journal if Industrial and Engineering Chemistry*, 15:136-140, 2009.
Crossland et al., "Soft-etch mesophorous hole-conducting block copolymer templates", *ACS Nano*, 4(2):296-966, 2010.
Davankov and Tsyupupa, *React. Plym.*, 13:27, 1990.
Hainey et al., *Macromolecules*, 24:117-121, 1991.
Hutmacher, "Scaffolds in tissue engineering bone and cartilage", *Biomaterials*, 21:2529-2543, 2000.
International Preliminary Report on Patentability issued in PCT Application No. PCT/CA2011/001254, mailed May 30, 2013.
International Search Report issued in PCT Application No. PCT/CA2011/001254, mailed Feb. 2, 2012.

* cited by examiner

REVERSIBLY RESPONSIVE LIGHT-SCATTERING PHOTONIC MATERIAL

CROSS REFERENCE TO RELATED APPLICATIONS

This application is a national phase application under 35 U.S.C. §371 of International Application No. PCT/CA2011/001254 filed Nov. 10, 2011, which claims priority from U.S. Provisional Application No. 61/413,746 filed Nov. 15, 2010. The entire contents of each of the above-referenced disclosures is specifically incorporated herein by reference without disclaimer.

TECHNICAL FIELD

The present disclosure is related to the field of light-scattering photonic materials. In particular, the present disclosure relates to light-scattering photonic materials that may be reversibly responsive to one or more external stimuli, and which may be a thin film material.

BACKGROUND

Scattering of light may affect why objects look the way they look. Scattering of light may result in objects appearing to have a matt finish, as opposed to shiny or reflective surfaces which have less scattering of light. Intense scattering of light may result in a surface that appears white, such as in the case of white paper, due to the scattering and mixing of incoming light. Scattering of light may be a phenomenon used in various products, which may be known as "smart glass," which may change their light transmission state from opaque (i.e., scattering most or all incident light) to clear (i.e., scattering little or no incident light) by electric stimulation [1].

The effect of incoherent scattering of light may be due to light travelling through a material while experiencing a modulation in the refractive index of its surrounding (e.g., the material). This modulation may cause light to refract, reflect and/or diffract in substantially random directions, which may cause incoming light of different wavelengths to mix together, resulting in an appearance of the color white.

Types of light-scattering may include, for example: Mie scattering, Tyndall scattering, Rayleigh scattering and Geometric scattering. For scattering of light to occur, typically two or more materials with different refractive indexes may be present. The type of light-scattering produced may be based, for example, on the distance over which the variation of refractive index occurs, the shape or interface between the two or more materials, and/or the magnitude of change in refractive index between the two or more materials.

Rayleigh scattering may occur when the variation in refractive index is on a scale smaller than the wavelength of incident light, for example variations caused by atoms and molecules. Tyndall scattering may occur on a relatively slightly larger scale, for example due to colloids or particles in suspension, such as in milk. Mie scattering may occur when the variation in refractive index is on a scale that may be similar to the wavelength of the incident light, and has been described mathematically for light incident on spherical particles. In both of these types of scattering, shorter wavelengths may be scattered to a greater extent than longer wavelengths. Geometric scattering may occur on a scale larger than the wavelength of the incident light and may be described by the laws of geometric optics.

SUMMARY

In some example aspects of the present disclosure, there is provided a light-scattering photonic material comprising a matrix defining a plurality of disordered voids; wherein a difference in refractive indices between the matrix and the voids gives rise to scattering of incident light, producing a first optical effect; wherein, in response to an external stimulus, the material exhibits a change in at least one of a refractive index and a structure of at least one of the matrix and the voids, causing a change in the scattering of incident light; and wherein the change produces a second optical effect that is detectably different from the first optical effect, and the change is at least partially reversible. In some examples, the material may be a thin film material (e.g., having a thickness of about 100 micrometers or less). In some examples, the voids may have a size of about 20 micrometers or less.

In some example aspects of the present disclosure, there is provided a reversibly tunable (i.e., reversibly responsive to an external stimulus) scattering thin film material comprising of disordered voids in a matrix, tunable from a first optical effect to a second optical effect and back; wherein changes in the refractive index of the voids or the matrix and/or changes in the dimensions or structure of the voids or spacing between the voids results in a modified portion, different from the initial structure, the changed portion giving rise to a second optical effect detectably different from the first optical effect which can return back to the first optical effect with or without the use of external stimuli.

The present disclosure also provides example methods of manufacture of the material described above, example uses of the material described above, and example devices incorporating the material described above.

BRIEF DESCRIPTION OF DRAWINGS

Aspects of the present disclosure will be discussed in detail below, with reference to the drawings in which.

DETAILED DESCRIPTION

Figure 1:
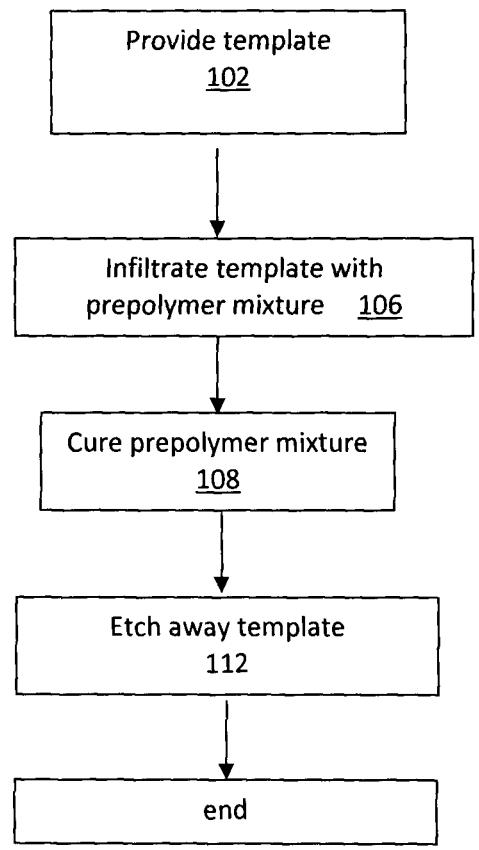
FIG. 1 is a flowchart showing steps in an example method of manufacturing an example photonic material.
Figure 2:
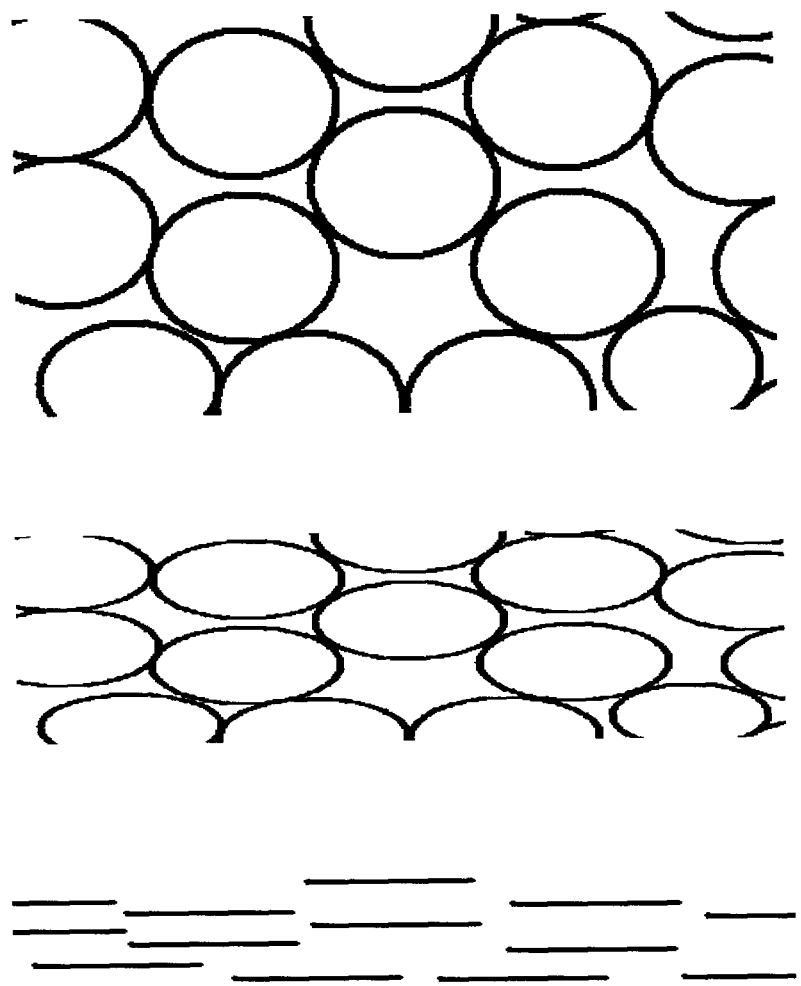
FIG. 2 is an illustration of an example photonic material at different stages of compression.

All examples and embodiments discussed in the present disclosure are for purposes of illustration only and are not intended to be limiting. Any theory presented is only to assist in understanding the present disclosure, and is not intended to be limiting or binding.

The present disclosure describes examples of a disordered photonic material, having a polymer matrix defining a plurality of disordered voids. Differences in the refractive indices of the voids and the polymer matrix may give rise to scattering of incident light, resulting in a first scattering of light, which may be optically detectable as a first optical effect. The material may be responsive to an external stimulus resulting in a change in the scattering of light, which may be optically detectable as a second optical effect that is detectably different from the first optical effect.

The present disclosure describes examples of a photonic material, which may be a reversibly tunable thin film light-scattering material, which in some examples may be based on a polymeric material having relatively disordered voids. In some examples, the photonic material may exhibit wavelength- or wavelength range-specific light-scattering and/or transmission. In some examples, the material may be designed such that the wavelengths of the scattered light may be selected to be within the ultraviolet, visible, or infrared range of the electromagnetic spectrum or combinations of these.

In some examples, a porous material may be referred to as a foam. Foams may be produced in a variety of ways and may be made of various types of materials including, for example, polymers, elastomers, ceramics and metals. The presence of pores in such materials may cause these materials scatter light, which may result in the appearance of a substantially white material. In some examples, foams may be closed cell, open cell and/or reticulated, which may result in variations in their properties.

Example methods to create such materials may include, for example, using a non-solvent in a polymer mixture, followed by the removal of the non-solvent to create pores (for example, as described in U.S. Pat. Nos. 3,306,763, 3,149, 967).

The presently disclosed photonic material may be different from conventional porous materials at least in the reversible or partially reversible nature of the material, for example wherein the material may return to its original state after changing the degree of light-scattering within the material. In some examples, the presently disclosed photonic material may also be different from conventional foam materials at least in the size of the voids in the disclosed material and/or in the thickness of the film. For example, conventional foams typically have void sizes on the order of 100 micrometers, whereas the disclosed material, which may be provided as a thin film material, may have void sizes in the range of about 10 nanometers to about 100 micrometers, for example 20 micrometers or less, which may result in more significant light scattering. In some examples, the presently disclosed photonic material may differ from conventional foams in that the disclosed photonic material may be provided as a thin film material (e.g., having a thickness of about 100 micrometers or less). The manufacturing method for the disclosed photonic material may also differ from that of conventional foam materials.

When the disclosed material responds to an external stimulus, a change in the material may result in a detectable change in the amount of light scattering (e.g., from large amount of scattering, causing a "white" appearance, to little or no scattering, causing a transparent appearance).

In some examples, the photonic material may be based on a thin film material (e.g., having a thickness of about 100 micrometers or less), which may have an initial structure and corresponding initial light-scattering. This light-scattering may be due to the presence of voids in the material matrix, and may be dependent on the refractive index of the voids and the material matrix, and/or the dimension of the voids and/or their spacing. In some examples, the material may define a viewing or detection surface (which may also be referred to as the top surface), which may receive incident light and from which light may be reflected, scattered and/or transmitted. The reflected, scattered and/or transmitted light from the detection surface may be optically detectable (e.g., by the naked human eye or by an optical detector) as an optical effect. The initial structure of the photonic material may give rise to a first optical effect that is detectable from the detection surface. Detection of the first optical effect can be visual (e.g., using the unaided human eye) and/or through the use of an apparatus, such as an optical detector.

In some examples, voids within the matrix material may vary in shape and/or size, for example ranging from about 10 nanometers to about 100 micrometers, for example about 20 micrometers or less. Different examples of the material may have different void sizes and/or shapes. Alternatively or in addition, the voids within a single example of the material may have different void sizes and/or shapes. This may affect the type of light-scattering observed and/or the physical properties (e.g., rigidity, robustness) of the photonic material. In some examples, the density of voids within the matrix material may also vary between different examples of the materials and/or in different regions of a single example of the material. For example, the voids may be relatively sparse, for example resulting in independent or unconnected voids, or some or all of the voids may relatively dense, for example resulting in one or more interconnected voids.

In some examples, the photonic material may initially exhibit a first optical effect based on the intrinsic light-scattering behaviour of the photonic material in the material. When exposed to an external stimulus, light-scattering in the photonic material may be varied, resulting in a second optical effect that is different from the first optical effect due to the change in light-scattering. This change in scattered light may be short lasting or long lasting, for example the time duration of the second optical effect (before reverting to the first optical effect) may be dependent on the relaxation time of the photonic material.

In some examples, the change from the first optical effect to the second optical effect may be activated at any point during the life of the photonic material, for example at any time from initial manufacturing to a final "on-the-shelf" device or product. In some examples, the material may be designed to be multiply-reversible (e.g., where the material is intended for multi-use applications). In other examples, the material may be designed to have a limited number of response reversals (e.g., where the material is intended for limited-use or single-use applications). In some examples, the duration of the second optical effect may be selectively engineered, for example through the choice of the material composition of the photonic material and/or its environments. In some examples, the duration of the second optical effect may be modified by various external stimuli. In some examples, the material may have a first optical effect that appears "white", a second optical effect that appears transparent or semi-transparent, and may revert to the first "white" optical effect after a certain period of time.

In some examples, light-scattering of the material may be modified and/or aided by various external stimuli. An example external stimulus may change the refractive index of the void space and/or the matrix of the photonic material, for example by infiltrating another compound within the voids and/or the matrix. This infiltration may be achieved, for example, mechanically, electrically, chemically, by vapour, shear force, vacuum, pH, magnetically, thermally, electromagnetically and/or acoustically. In some examples, light-scattering of the material may also be changed by an external stimulus that changes one or more dimensions of the voids and/or the spacing between the voids, for example mechanically, by vapour, electrically, vacuum, shear, pH, chemically, magnetically, thermally, electromagnetically and/or acoustically.

In some examples, the reversibility rate of the photonic material may be relatively long lasting (e.g., on the order of hours or more) or relatively short lasting (e.g., on the order of milliseconds or seconds), and in some examples the photonic material may be restored to the first optical effect by one or more external stimuli including, for example, mechanically, by water vapour, electrically, vacuum, shear force, change in pH, chemically, magnetically, thermally, electromagnetically and/or acoustically.

In some examples, the optical effect of the photonic material may be changed (or tuned) via mechanical deformation (e.g., compression and/or expansion) of at least a portion of the material. Additionally or alternatively, for example, light-scattering changes may be achieved by mechanically deforming (e.g., stretching) the photonic material in the plane of the material (i.e., as opposed to perpendicular to a surface of the material). Mechanical deformation of the material may also be a combination of planar and perpendicular deformation.

In some examples, the random differences in refractive indices between the disordered voids and the polymer matrix may result in detectable light-scattering. Voids in a polymer matrix may be produced in various suitable ways, including, for example, templating strategies (such as that described in U.S. Pat. No. 6,261,469), which may use various types of templates ranging from, for example, silica spheres to surfactants behaving like a porogen (for example as described in In-Joo Chin et. Al., Journal of Industrial and Engineering Chemistry (2009) 15:136-140) to block copolymer templating (for example as described in Edward J. W. Crossland et al., ACS Nano (2010) 4(2):962-966), among others. In such examples, the templates may be removed from a polymer matrix leading to a porous structure with disordered voids in the polymer matrix. In some examples, polymer foams may be used to produce a porous polymer matrix with disordered voids, for example polymer foams that may be produced by trapping gases in a polymer matrix (e.g., elastomer matrix) or by emulsion techniques (for example as described in P. Hainey et al., Macromolecules (1991) 24:117-121).

Another example method for producing a porous polymer matrix with disordered voids may be to generate gas within a polymer film. Example porous polymer matrices may also be made from hypercrosslinked polymers (for example as described in V. A. Davankov, M. P. Tsyurupa, React. Polym. (1990) 13:27.) as well as polymers of intrinsic macroporosity (PIMs) (for example as described in P. M. Budd, et. al, Chem. Commun. (2004) 230.) which may be created by the inefficient packing of polymer chains to create voids within a polymer matrix. Other techniques for making porous polymer matrices with disordered voids may include, for example, fibre bonding, solvent casting, particulate leaching, membrane lamination and melt molding, among others (for example as summarized in Dietmar W. Hutmacher, Biomaterials (2000) 21:2529-2543). Other techniques may include, for example, freeze-drying, supercritical fluid-gassing, phase separation of two compounds, or 3D printing technologies such as direct-laser writing and fused deposition modeling (FDM), among others.

In some examples, if particle templating is used to manufacture the photonic material, the particles (which may also be referred to as templates) used to create voids may vary in size, for example ranging from about 10 nanometers to about 100 micrometers (e.g., 20 micrometers or less), and mixtures thereof. The template particles may be any suitable material, including, for example, metals, metal oxides, metal chalcogenides, crystalline solids, ceramics and/or polymers. The shape of the template particles may be irregular or regular, such as spherical or any other shape such as rods, squares, ovals, stars, for example. The template particles may be removed from the polymer matrix after the matrix is formed, or may remain either partially or fully within the polymer matrix. In some examples, the polymer matrix may be substantially free of template particles, however there may be minor amounts of residual template particles remaining (e.g., due to imperfect template removal), which may or may not affect the properties (e.g., mechanical properties and/or optical properties) of the material. In some examples, such residual template particles may be present in negligible amounts and have negligible effect on the material characteristics.

In some examples, where a templating method is used to manufacture the photonic material, the templating method may be different from conventional templating methods. For example, the disclosed templating method may use disordered particles as the template, to produce disordered voids in the resultant material. The disclosed templating method may also use non-spherical and/or non-uniform (e.g., different size and/or shape) particles in the template. This may simplify the disclosed templating method compared to conventional templating methods, in some examples.

In some examples, foams may be used for manufacturing the photonic material. Gases used in such manufacturing may be of any suitable nature, for example ranging from noble gases to hydrogen, oxygen, nitrogen and air, among others. In some examples, emulsion strategies may also be used to create elastomer foams.

In some examples, the polymer matrix may be made of any suitable material, including, for example, elastomers, biopolymers and other polymers. In some examples, the composition of the polymer matrix may be selected to achieve desired mechanical properties (e.g., elasticity, compressibility, flexibility, etc.) for the photonic material. The mechanical properties of the photonic material may also be controlled by designing for certain void sizes, shapes and/or densities, for example. In some examples, controlling for the presence of particles (e.g., template particles) within the polymer material may also allow for control of the mechanical properties of the photonic material. For example, where the photonic material is intended to be responsive to a mechanical stimulus (e.g., mechanical compression), it may be desirable to have compressibility and elasticity of the material to be within a certain range of values. In other examples, such as where the photonic material is intended to be responsive to a non-mechanical stimulus (e.g., heat), compressibility and/or elasticity of the photonic material may not be a concern.

The photonic material may be at least partially or fully reversible, from the second optical effect back to the first optical effect (e.g., by a reversal of the structure or refractive index of the material back to the initial state, causing a reversal of the reflectivity and transmission spectra back to the initial state). The rate at which this reversal process occurs may be related to one or more properties of the photonic material (e.g., resiliency of the polymer matrix) and its environment (e.g., strength of the external stimulus). The reversal rate may also be affected by one or more external stimuli such as air pressure, vacuum, mechanical stress or strain, temperature, water vapour, friction, magnetic, electromagnetic, chemical or electric fields as well as sound, among others.

In some examples, the photonic material may be incorporated into a photonic device, which may include one or more additional layers, for example as described below.

In some examples, the photonic material may be provided on a support layer, which may be permanently attached to the material or removably attached to the material. The support layer may provide structural support and/or may contribute to the first optical effect and/or the second optical effect (e.g., by providing a detectable background image or color). The support layer may be provided on a surface of the material, such as on the detection surface or the surface opposite to the detection surface or both. Where the support layer is provided on the detection surface, the support layer may be at least partially transmissive to light, to allow for optical detection of the optical effect exhibited by the photonic material.

In some examples, the material may include one or more additional substrate layers and/or protective layers, depending on the application. For example, one or more additional substrate layers may be added for rigidity, robustness, adhesiveness, ease of handling, or other purposes. For example, one or more protective layers may be added for reusability, robustness, ease of handling, or other purposes. Where appropriate, the additional substrate layer(s) and/or protective layer(s) may be provided on the detection surface and/or opposite to the detection surface of the material. In some examples, the additional substrate layer(s) and/or protective layer(s) may be substantially transparent or transmissive to light, to allow for optical detection of the optical effect. In some examples, the additional substrate layer(s) and/or protective layer(s) may be selected for certain desirable mechanical and/or optical properties (e.g., flexibility, transparency, etc.).

In some examples, the photonic material may be provided with an adhesive layer, such that the material may be attached to an article. Alternatively or in addition, the material may be manufactured directly on an article.

In some examples, the photonic material may be used in combination with background layer (which may also serve as the support layer, in some examples), which may provide a back reflector, a coloured background, a black background, a back display, as well as other images, symbols, numbers or words, for example. In some examples, the background layer may be concealed by the photonic material in its initial state (e.g., having a first light-scattering optical effect) and revealed by the photonic material when the material responds to an external stimulus (e.g., changing to a second transparent optical effect), or vice versa. In some examples, the background layer may contain an image and/or information, which may be at least one pattern, image, alphanumeric character, word and/or symbol, for example, which may or may not be pixelated. Response of the photonic material to an external stimulus may reveal or hide the background layer to an observer, for example due to a change in light-scattering. In some examples, additives such as, for example, nanoparticles, dyes, pigments and/or fluorescing agents may also be placed above, below or within the photonic material. Such additives may influence the first and/or second optical effect exhibited by the material, and/or be discernible only in one of the two optical effects.

In some examples, the optical effect of the photonic material may be controlled (or tuned) electrically, for example using an electroactive polymer or by the use of Maxwell stress, to control the light-scattering of the material. For such an example, the polymer matrix of the photonic material may be made of a polymer such as that described in U.S. Patent Application Publication Nos. 2009/0034051 and 2008/0224103, for example. The material may swell or shrink in response to an electrical stimulation (e.g., due to the swelling or shrinking of the material due to uptake or release, respectively, of a solvent by the material).

In some examples, the photonic material may be designed to respond to an external stimulus by change from relatively high light-scattering to relatively low light-scattering, from relatively low light-scattering to relatively high light-scattering, and/or change the wavelengths of light-scattering.

For example, in response to an external stimulus, the material may exhibit a relatively large change in the size of its voids (e.g., from open voids to total collapse of the voids) which may result in a relatively significant change in light-scattering (e.g., from high light-scattering to little or no light-scattering)—this may be the case where the photonic material is relatively compressible. In another example, in response to an external stimulus, the material may exhibit a relatively small change in the size of its voids, which may result in a relatively small change in light scattering (e.g., from high light-scattering to modest light-scattering)—this may be the case where the photonic material is relatively rigid.

The wavelength of light scattered may also be dependent on the sizes and/or shapes of the voids. For example, smaller voids may scatter light of shorter wavelengths while larger voids may scatter light of longer wavelengths (which may be in addition to scattering of shorter wavelengths). Thus, changes in the sizes and/or shapes of the voids in response to an external stimulus may also effect a change in the wavelengths of light scattered.

Different examples of the photonic material may exhibit different responses to the same external stimulus. In some examples, a single photonic material may also exhibit different responses to different external stimuli.

In some examples, if a template is for manufacturing the photonic material, the material may be manufactured by first casting the templates into a thin film by using, for example, slot-die coating, gravure or roll coating, printing techniques such as flexography, evaporation techniques, spin-coating techniques, and/or spraying onto a substrate. This may be followed by the infiltration of the polymer matrix precursor into the template and, in some examples, removal of the templates after the polymer matrix has cured. In some examples, some or all of the template may remain within the matrix material.

In some examples, during manufacturing, the photonic material may be stimulated to change to the second optical effect. The material may then be returned to its original state (i.e., the first optical effect) when used. For example, in manufacturing, the material may be stimulated to change from a first optical effect (e.g., light-scattering) to a second optical effect (e.g., transparent), and use of the material would involve reversing the material to its first optical effect (e.g., light-scattering) after which the material may not be responsive to any further stimuli, thus providing a single-use only material.

Alternatively, in some examples, at least a portion of the material may be permanently changed to its second optical effect. For example, a portion of the material may be stimulated during manufacturing (e.g., with mechanical compression) to exhibit the second optical effect (e.g., transparency) while the remaining material is unaffected. In use, the already-modified portion of the material may be useful as a reference such that the user can know what the second optical effect should be, for comparison to the first optical effect.

At least a portion of the material may also be partially stimulated (e.g., partially compressed, such as by embossing) or otherwise modified (e.g., by introducing one or more additives). In use, the modified or partially stimulated portion of the photonic material may exhibit a response to an external stimulus that is different from the response of the unmodified portions. For example, portions of the material may be embossed, such that the embossed portions may respond to mechanical compression differently from unembossed portions. In some examples, information may be encoded into the photonic material in this manner.

In some examples, different portions of the photonic material may have different composition (e.g., different constituents and/or different dimensions) such that they respond to a given external stimulus differently. For example, the photonic material may include portions that are responsive to the external stimulus while other portions are less responsive or unresponsive. For example, rigid particles may be introduced into portions of an otherwise mechanically responsive photonic material to form a pattern, such that compression of the material causes no response in those portions of the material, thus revealing the pattern. Such a material may be useful for encrypting information and/or revealing hidden images and/or messages.

In some examples, the photonic material may be a thin-film material, for example equal to or less than approximately 100 micrometers in thickness. In some examples, the photonic material may be a porous photonic material having disordered voids having, for example, an average diameter in the range of about 20 nm to about 100 μm. At least some of the voids may be interconnected or isolated.

In some examples, the photonic material may comprise a polymer. For example, the polymer may be selected from the group of: polystyrenes, polymethacrylates, polyacrylates, polyurethanes, polyesters, polyethylenes, polypropylenes, polyvinylchlorides, polyisoprene, polybutadiene, polydienes, waxes, and copolymers or combinations thereof. The polymer may be a cross-linked polymer network, for example, to form a polymer matrix.

In some examples, the polymer may comprise linear polymer chains, or may contain a given density of cross-linking groups in order to provide a cross-linked polymer network. These crosslinks may be, for example, based on covalent bonds, ionic bonds, polar covalent bonds, chemical bonds, physical bonds, dispersion interactions, Van der Waals interactions, nanoparticles interactions, surface interactions, hydrogen bonds, coordination bonds, electrostatic interactions, hydrophobic interactions, fluorophobic interactions, phase segregation domains, or combinations thereof. The density and distribution of crosslinks throughout the polymer may be selected to provide the polymer with certain stiffness or flexibility. For example, a higher density of crosslinks may result in a stiffer polymer photonic glass material and may result in a smaller deformation response in the disordered structure when the material is compressed.

In some examples, information may be encoded into the photonic material by incorporation of an encoding component into the photonic material, for example by vapour deposition and/or printing of organic, polymeric, inorganic and/or nanoparticulate material onto the surface and/or into the interior structure of the photonic material, for example to form a pre-selected pattern/logo/image/etc. Printing of such an encoding component may include, for example, thermal printing, ink-jet-printing, screen printing, and other printing processes or combinations thereof. The encoding component may be added to encode information, such as alphanumeric characters, images, logos, patterns, or combinations thereof.

Such an encoding component may affect the optical, mechanical and/or adhesive properties of the material (e.g., according to the pre-selected pattern/logo/image/etc), which may affect the first and/or second optical effects. For example, encoding components within the material may cause portions of the material to be unresponsive to an external stimulus (e.g., the encoding component may increase the rigidity of portions of the material, making those portions unresponsive to a mechanical stimulus), such that when subjected to the external stimulus, the material will change to a second optical effect in all but those encoded portions, thus revealing the encoded information.

In some examples, the disclosed material may include encoded information (e.g., using an encoding component as described above and/or using a background layer having information encoded thereon). For example, the photonic material may include an underlying image, data content, color, etc. The perception of such underlying features may be different between the first and second optical effects. For example, the compression of the photonic material may change a first opaque optical effect to a second transparent optical effect, which may reveal overtly or covertly encoded information, such as alphanumeric characters, images, patterns or logos.

In some examples, the photonic material may be provided as flakes or small pieces (e.g., ranging in size from a few centimeter to a micron). Flakes or pieces of the photonic material may be made by breaking up larger pieces of the material (e.g., using grinding, milling or any other suitable method). Alternatively, the photonic material may be manufactured in flakes or small pieces directly. In some examples, the flakes or pieces may be held together with a binder, which in some examples might be itself sensitive to an external stimulus, such as a mechanical, electrical, chemical, water vapour, shear force, vacuum, pH, magnetic, thermal, electromagnetic and/or acoustic stimulus. For example, the flakes of material may be manufactured and may use binders and additives similar to that described in U.S. Patent Application No. 61/109,956 for which a PCT application was filed on Jul. 23, 2009.

Applications

In some examples, the photonic material may be incorporated into a security and/or authentication device.

In some examples, the photonic material may be used as a rewritable surface, such as a replacement for paper or as a whiteboard. The material may be used in combination with a light source, for example using an adhesive to attach the material to the light source or by laying the film above the light with no adhesive, or may be manufactured directly on a light-source.

In some examples, light-scattering materials may be used as light diffusers. A light diffuser may be based on various technologies, including, for example, ground glass, Teflon diffusers, holographic diffusers, opal glass diffusers and greyed glass diffusers, among others. An example conventional diffuser may be the LIGHT-UP film used for diffusing light from LCD backlights[4]. In some examples, the photonic material may be useful as a light diffuser.

In some examples, the photonic material may be used as a component in a game, a toy, an arts and crafts product, a piece of clothing, etc.

In some examples, the photonic material may be used to modify (e.g., filter) the light emission from a light source. The material may be used with an existing light source, for example using an adhesive to attach the material to the light source, or may be manufactured directly on a light source. For example, the photonic material may be tunable (e.g., having known responses to certain stimuli) to change the color or light emission of a light source and/or change the viewing angle of a light source. For example, the material may be used to modify the optical perception of a digital display device.

In some examples, the photonic material may be incorporated into a security and/or authentication device, for example wherein changes in light-scattering may be observed in response to mechanically compression of the material, thus validating its authenticity. The security and/or authentication device may be combined with a light source, for example using an adhesive, or may be manufactured directly on the light source.

In some examples, the photonic material may be useful in advertisements and/or applications which give prizes such as cups, lottery items and games, among others.

In some examples, the photonic material may be useful in the field of temperature, pH and/or chemical monitoring, among others.

In some examples, the photonic material may be useful in bank notes, such as wherein reversible changes in light-scattering are observable by eye upon mechanical compression, such as for authentication purposes.

In some examples, the photonic material may be useful the field of encrypted information.

In some examples, the photonic material may be useful in the field of anti-counterfeit security features. For example, the material may be useful in the fields of: a) documents of value, including legal tender, bills of exchange, money orders, share certificates, bonds, stamps, land titles; b) cards and identification, including passports, birth certificates, drivers licenses, visa documents, health cards, social security cards, national identity cards, work permits, citizenship documents, alien registration documents, credit cards, debit cards, gift cards, access passes, membership cards; and c) product packaging and tagging, including that for over-the-counter and prescription drugs, medicines and pharmaceuticals, vaccines, vitamins, nutritional supplements, herbal formulations, herbicides, pesticides, apparel, accessories, watches, clothes, shoes, handbags, cosmetics, toys, jewelry, gems, precious metals, compact disks, videotapes, DVDs, computer software, video games, other media, technology products, batteries, airline parts, auto parts, small arms, wine, spirits, beer, cigarettes, cigars, books, sports equipment and memorabilia, collectibles, antiques, cups, diapers, tape, saran wrap, adhesives, bandages, gloves; and other such authentication applications.

In some examples, the photonic material may be useful in the field of anti-counterfeit security features, tamper-proof packaging, tracking devices in manufacturing, processing, and product distribution, among others. For example, the material may be useful for a re-usable or one-time-use security device, safety seal, or tamper-evident label, among other possibilities.

In some examples, the photonic material may be useful in the field of temperature monitoring, such as wherein changes in the local environment may cause a change in the light-scattering properties of the material.

In some examples, the photonic material may be useful in the field of chemical monitoring.

In some examples, the photonic material may be useful in tunable lasers.

In some examples, the photonic material may be useful in marketing.

In some examples, the photonic material may be useful in the field of encrypted information, such as in any of the articles mentioned above.

EXAMPLES

Examples of the disclosed photonic material are now described. In these examples, the photonic materials may include an acrylate polymer matrix manufactured using a template method. For example, the polymer used in these example materials may include neopentyl glycol diacrylate.

Figure 3:
FIG. 3 shows images of an example photonic material with and without compression.
Figure 3:
Figure 3:

FIG. 3 shows image of an example photonic material. In this example, the material is reversible between a first "white" optical effect and a second transparent optical effect. In this example, the material is responsive to mechanical compression. When one or more portions of the material are compressed, the light-scattering in those portion(s) is decreased, resulting in a transparent effect in those portion(s). In the images of FIG. 3, the top image shows the material in its initial state (having a "white" optical effect throughout); the middle image shows the material having portions compressed with fingernails; and the bottom image shows the material having portions compressed by a stamp, revealing the image of the stamp. In this example, the material is made of relatively large (in this example, about 1.2 micron in diameter) polydisperse spheres, etched in a polymeric matrix.

Figure 4:
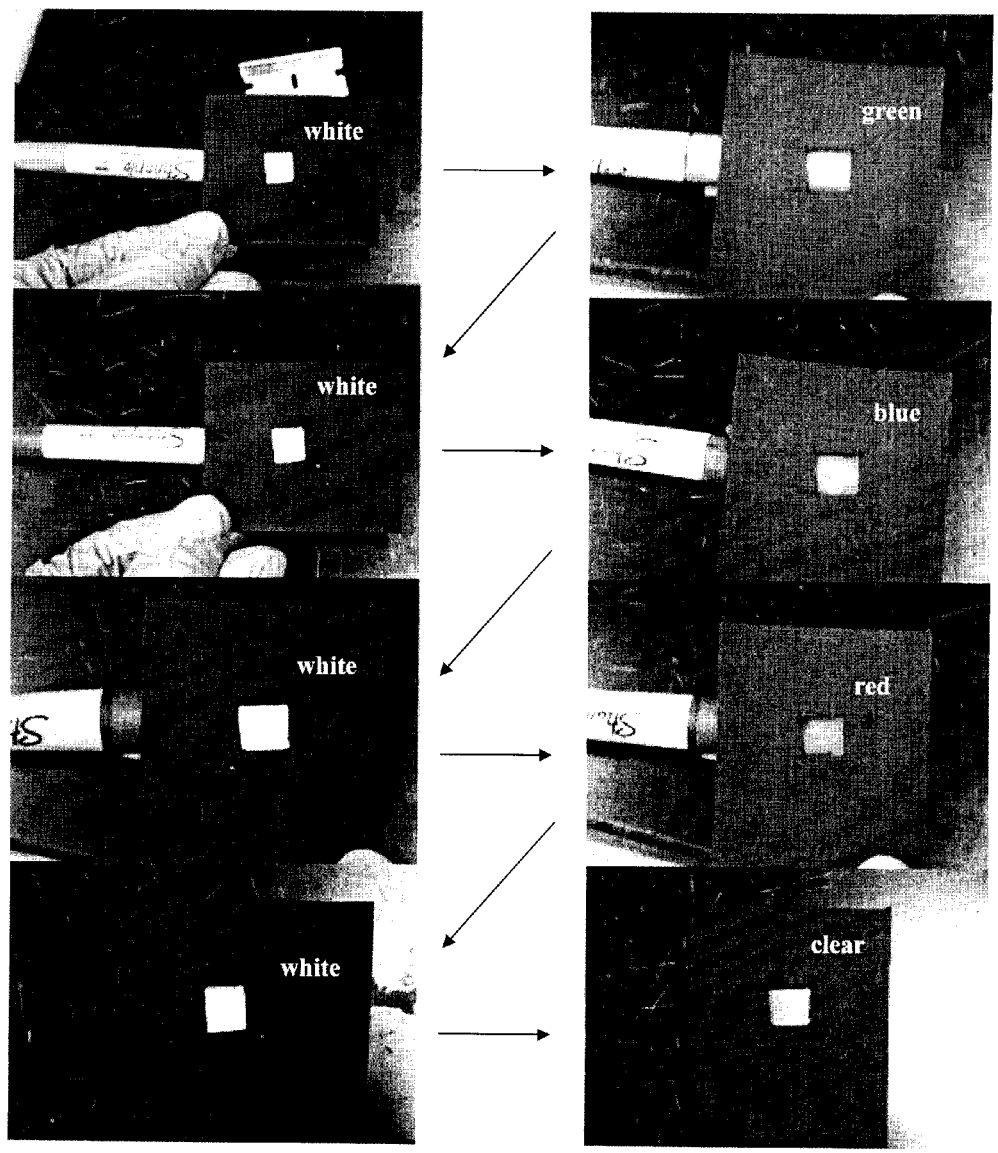
FIG. 4 shows images of an example mechanically deformable photonic material which is thermally reversible.

FIG. 4 shows an example of a photonic material which is responsive to mechanical compression. In this example, the first optical effect is a white appearance, due to a relatively high amount of light-scattering, and the second optical effect is a substantial transparency, due to a relatively low amount of light-scattering. As shown, the material may be reversible and may be repeatedly stimulated, such that the material may cycle between the first optical effect (a white appearance) and the second optical effect (a transparency, through which the colour of the underlying background is detectable).

Figure 5:
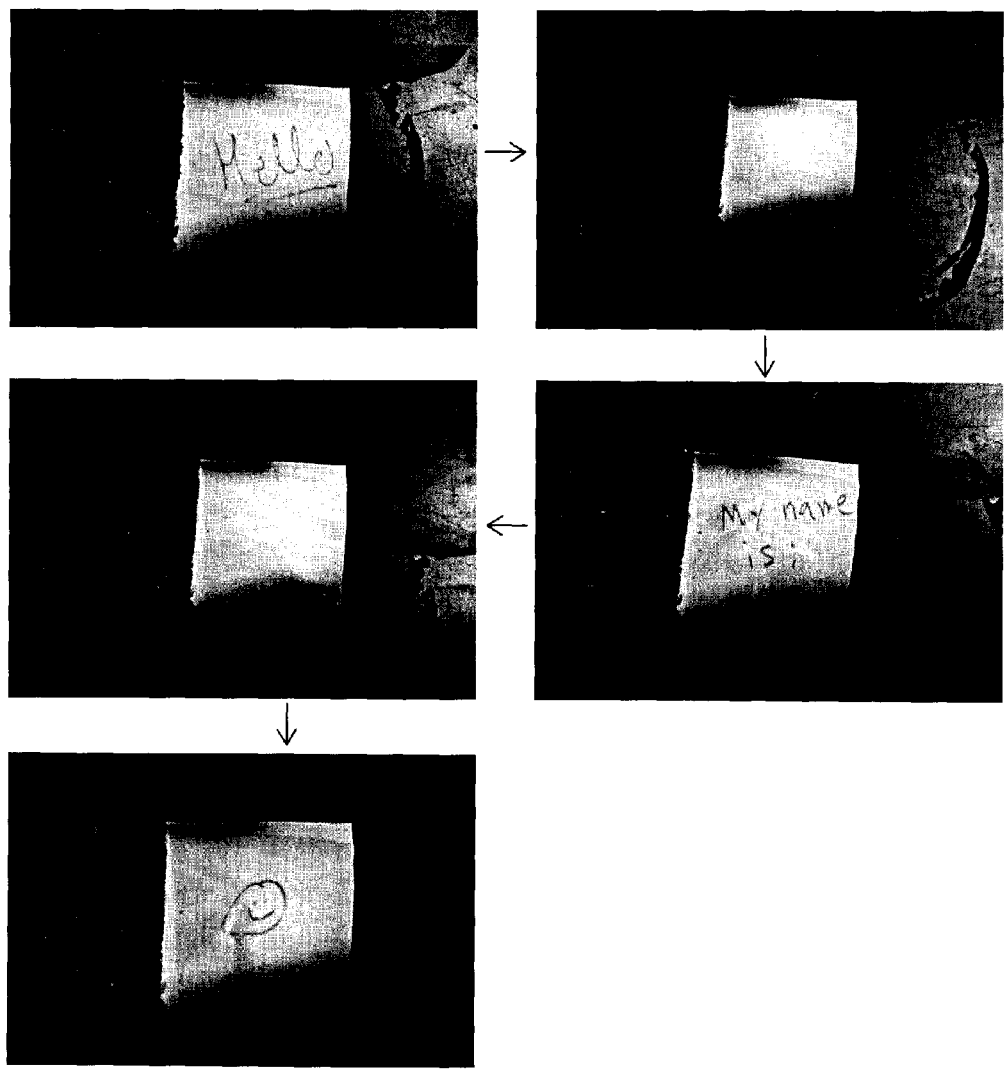
FIG. 5 shows images of another example mechanically deformable photonic material.

FIG. 5 illustrates an example photonic material (in this example, an elastomeric material) before and after compression. In this example, the material possesses a relatively long relaxation time, where the relaxation time is the time required for the material to return from a compressed state to its initial uncompressed state. In this example, the material was created using a template using a mixture of 300 nm and 190 nm silica spheres to create disorder. The spheres were etched using 4% HF overnight. In this example, the material may compressed to change the degree of light-scattering using, for example, a stylus, finger or a nail. In this example, the relaxation time of the material was less than about 5 minutes.

Figure 6:
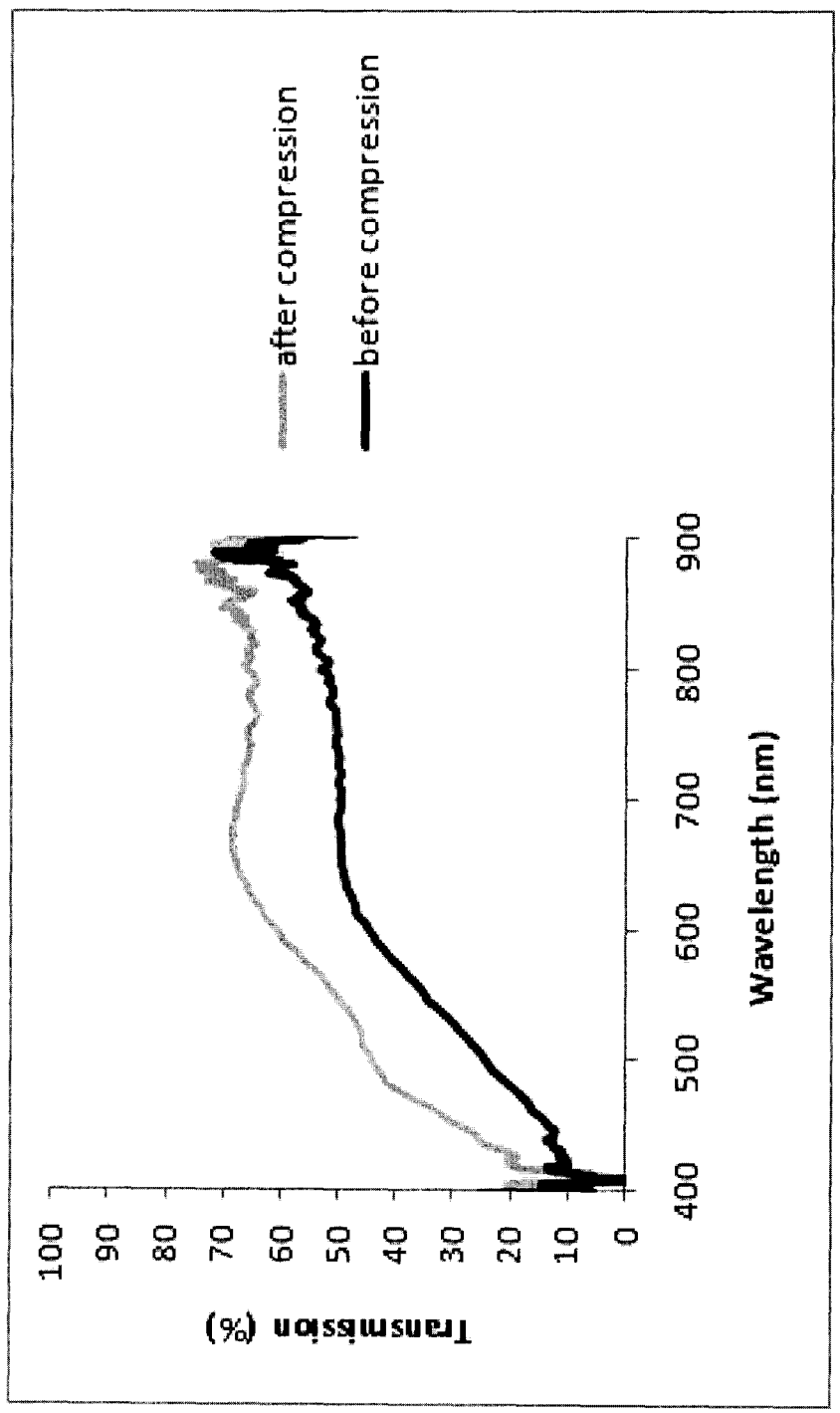
FIG. 6 and FIG. 7 show example transmission spectra and example reflectivity spectra respectively of an example photonic material before and after mechanical deformation.
Figure 7:
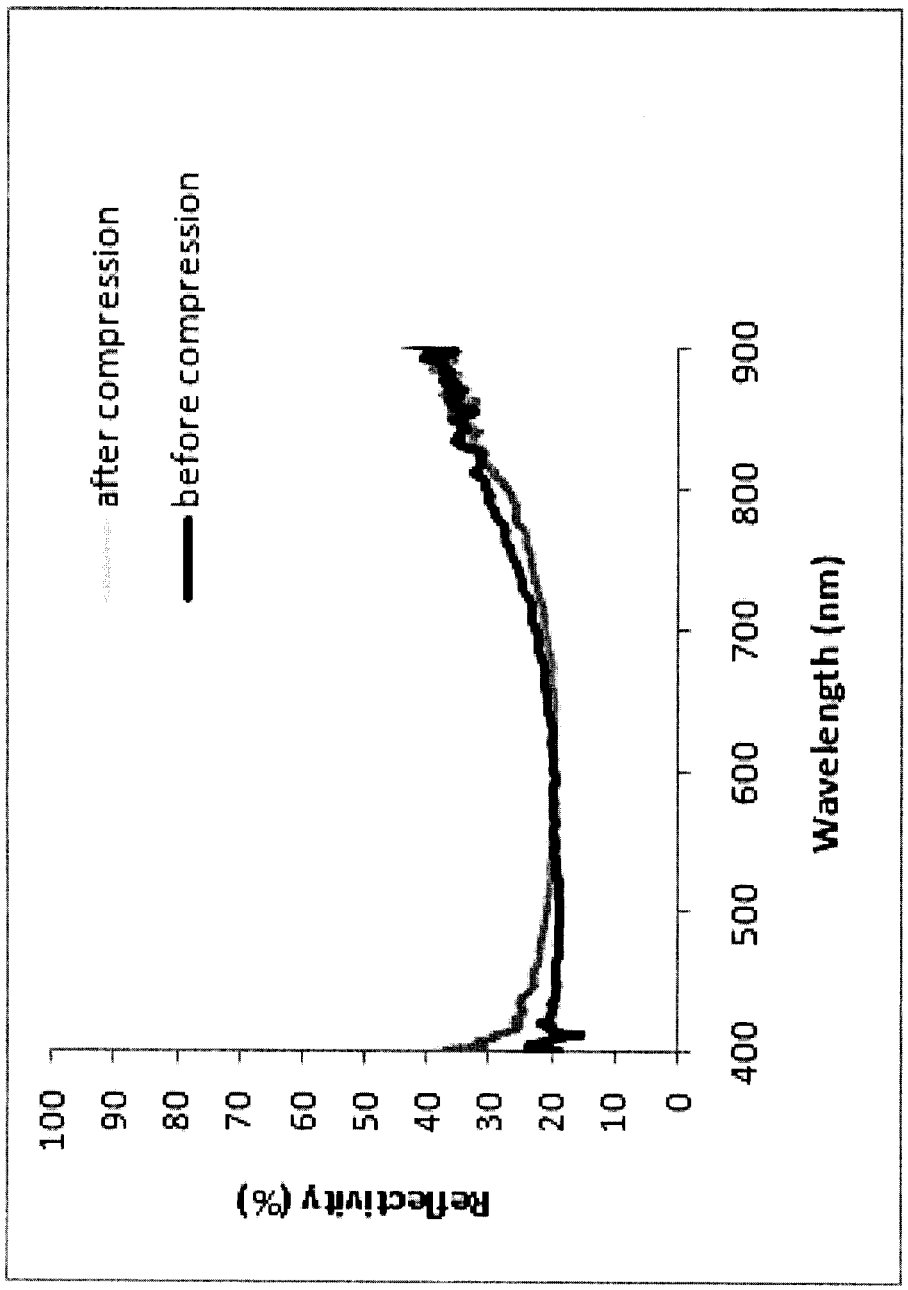

FIG. 6 illustrates the transmission spectrum of the example photonic material of FIG. 5 before and after compression. FIG. 7 illustrates the reflection spectrum of the example photonic material of FIG. 5 before and after compression. While the reflection spectrum is relatively unchanged before and after compression, the transmission spectrum exhibits an optically detectable difference, which may be evidence of a detectable difference in light-scattering of the material before and after compression.

The embodiments of the present disclosure describe above are intended to be examples only. Those of skill in the art may affect alterations, modifications and variations to the particular embodiments without departing from the intended scope of the present disclosure. In particular, selected features from one or more of the above-described embodiments may be combined to create alternative embodiments not explicitly described. All values and sub-ranges within disclosed ranges are also disclosed. The subject matter described herein in the recited claims intends to cover and embrace all suitable changes in technology. All references mentioned are hereby incorporated by reference in their entirety.

The invention claimed is:

1. A light-scattering photonic material comprising a matrix defining a plurality of disordered voids;
   wherein a difference in refractive indices between the matrix and the voids gives rise to scattering of incident light, producing a first optical effect;
   wherein, in response to an external stimulus, the material exhibits a change in at least one of a refractive index and a structure of at least one of the matrix and the voids, causing a change in the scattering of incident light; and
   wherein the change produces a second optical effect that is detectably different from the first optical effect, and the change is at least partially reversible.

2. The material of claim 1 wherein the material is a thin film material.

3. The material of claim 2 wherein the thin film material has a thickness of 100 micrometers or less.

4. The material of claim 3 wherein the thin film material has a thickness in the range of 200 nanometers to 100 micrometers.

5. The material of claim 1 wherein the material is fully reversible from the second optical effect back to the first optical effect.

6. The material of claim 1 wherein reversal from the second optical effect back to the first optical effect occurs when a second external stimulus is applied.

7. The material of claim 6 wherein reversal back to the first optical effect occurs within one second of application of the second external stimulus.

8. The material of claim 1, wherein the voids are defined to have a shape that is at least one of: spherical, cylindrical, cubic, ovoid, branched, and irregular.

9. The material of claim 1, wherein the voids are disordered but aligned along a dimension of the material.

10. The material of claim 1, wherein the voids have a size in the order of nanometers to micrometers.

11. The material of claim 10 wherein the voids have a size in the range of 10 nanometers to 100 micrometers.

12. The material of claim 11 wherein the voids have a size of 20 micrometers or less.

13. The material of claim 1, wherein the voids differ in at least one of size and shape.

14. The material claim 1 wherein the response to the external stimulus produces the second optical effect within one second of the application of the external stimulus.

15. The material of claim 1 wherein the external stimulus is at least one of: a mechanical stimulation, an electrical stimulation, a chemical stimulation, presence of water vapour, a shearing force, a change in atmospheric pressure, a change in pH, a magnetic stimulation, a thermal stimulation, an electromagnetic stimulation, and an acoustic stimulation.

16. The material of claim 15 wherein the mechanical stimulation is a mechanical deformation of the material.

17. The material of claim 16 wherein the mechanical deformation is at least one of a compression and a stretching of the material in at least one of a planar and a normal direction.

18. The material of claim 15 wherein the external stimulus is an electrical stimulation and the material response to the electrical stimulation by a swelling or shrinking.

19. The material of claim 1 wherein the material scatters light in at least one of an ultraviolet wavelength range, a visible wavelength range, and an infrared wavelength range.

20. The material of claim 1 wherein one of the first and second optical effects is due to a scattering of light that is greater than that of the other of the first and second optical effects.

21. The material of claim 1 wherein the material is provided as flakes.

22. The material of claim 21 wherein the flakes range in size in the order of several hundred nanometers to several micrometers.

23. The material of claim 1 wherein at least a portion of the material permanently exhibits the second optical effect.

24. The material of claim 1 wherein the matrix is a polymer matrix.

25. The material of claim 24 wherein the polymer matrix is made of a material selected from the group consisting of: polystyrenes, polymethacrylates, polyacrylates, polyurethanes, polyesters, polyethylenes, polypropylenes, polyvinylchlorides, polyisoprenes, polybutadienes, polydienes, waxes, and copolymers and combinations thereof.

26. The material of claim 1 further comprising an additive provided on a surface of the material or within the material.

27. The material of claim 26 wherein the additive is at least one of: a nanoparticle, a dye and a pigment.

28. The material of claim 1 wherein the voids are created within the matrix by at least one of: templating, gas bubble entrapment, emulsion templating and gas formation.

29. A photonic device comprising the material of claim 1 further comprising:
at least one of a support layer, a background layer, a protective layer, and an adhesive layer, provided on a planar surface of the material.

30. The device of claim 29 wherein the device comprises the protective layer, the protective surface being substantially transmissive to at least some light, to allow detection of the first and second optical effects.

31. The device of claim 29 wherein the device comprises the background layer, the background layer including at least one of: a coloured background, a reflective surface, a black surface, a display, a logo, an alphanumeric character, a word, a symbol, an image, and combinations thereof.

32. The device of claim 31 wherein the background layer is pixelated.

33. A method of manufacturing a photonic material, the method comprising:
providing a template of disordered particles;
infiltrating the template with a polymer precursor;
curing the polymer precursor to form a polymer matrix; and
removing the template to produce a polymer matrix defining a plurality of disordered voids.

\* \* \* \* \*